(12) United States Patent
Zimmer et al.

(10) Patent No.: US 7,861,746 B2
(45) Date of Patent: Jan. 4, 2011

(54) MOTOR VEHICLE HOSE

(75) Inventors: Werner Zimmer, Melsungen (DE); Iris Barthel, Schauenburg (DE); Thorsten Otto, Ahnatal (DE)

(73) Assignee: TI Automotive (Fuldabruck) Germany, Fuldabruck (DE)

( * ) Notice: Subject to any disclaimer, the term of this patent is extended or adjusted under 35 U.S.C. 154(b) by 970 days.

(21) Appl. No.: 11/684,448

(22) Filed: Mar. 9, 2007

(65) Prior Publication Data
US 2007/0215229 A1 Sep. 20, 2007

(30) Foreign Application Priority Data
Mar. 15, 2006 (EP) .................. 06005281

(51) Int. Cl.
*F16L 11/00* (2006.01)
(52) U.S. Cl. .................. 138/137; 138/140; 138/141; 138/125; 174/47
(58) Field of Classification Search .............. 138/137, 138/122, 103, 141; 174/47
See application file for complete search history.

(56) References Cited

U.S. PATENT DOCUMENTS

| | | | |
|---|---|---|---|
| 3,070,132 A | 12/1962 | Sheridan | |
| 3,580,983 A | 5/1971 | Jackson | |
| 3,828,112 A | 8/1974 | Johansen et al. | |
| 3,907,955 A | 9/1975 | Viennot | |
| 3,914,002 A | 10/1975 | Berliner et al. | |
| 4,215,384 A | 7/1980 | Elson | |
| 4,394,705 A * | 7/1983 | Blachman | 361/215 |
| 4,633,363 A | 12/1986 | Bordner | |
| 4,675,780 A | 6/1987 | Barnes et al. | |
| 4,870,535 A | 9/1989 | Matsumoto | |
| 5,124,878 A * | 6/1992 | Martucci | 361/215 |
| 5,142,782 A * | 9/1992 | Martucci | 29/890.144 |
| 5,170,011 A * | 12/1992 | Martucci | 174/47 |
| 5,192,476 A * | 3/1993 | Green | 264/127 |
| 5,381,834 A * | 1/1995 | King | 138/125 |
| 5,655,572 A * | 8/1997 | Marena | 138/125 |
| 5,974,649 A * | 11/1999 | Marena | 29/458 |
| 6,257,280 B1 * | 7/2001 | Marena | 138/125 |
| 6,302,150 B1 * | 10/2001 | Martucci et al. | 138/125 |

* cited by examiner

*Primary Examiner*—Patrick F Brinson
(74) *Attorney, Agent, or Firm*—Leydig, Voit & Mayer, Ltd.

(57) ABSTRACT

A motor vehicle hose consisting of plastic material, where the interior surface of the hose consists at least in segments of an electrically conducting plastic material. The invention provides for a section of electrically conducting plastic material that extends at least over a portion of the circumference of the hose and which is connected to the electrically conducting interior surface of the hose. The section extends in a radial direction into a layer of non-conducting plastic material. The section extends at least in segments in the longitudinal direction of the hose.

9 Claims, 2 Drawing Sheets

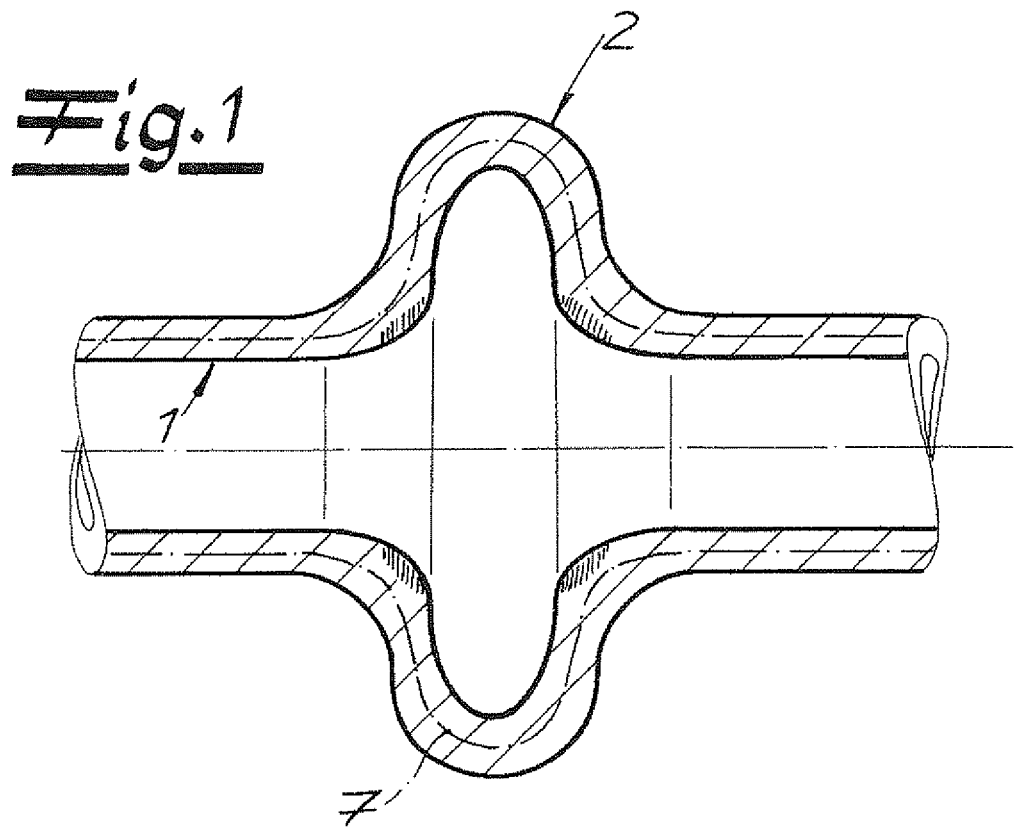
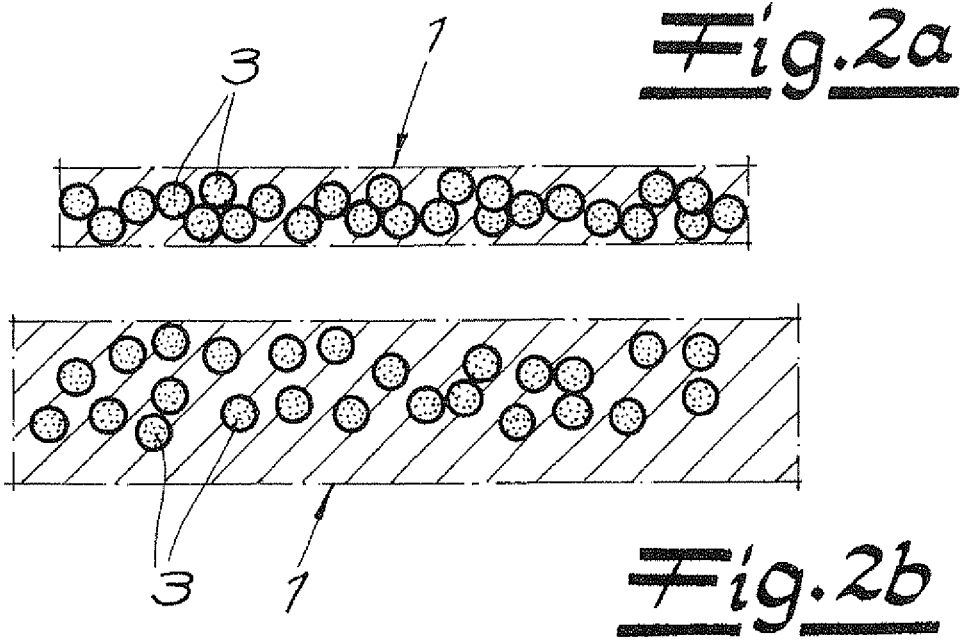

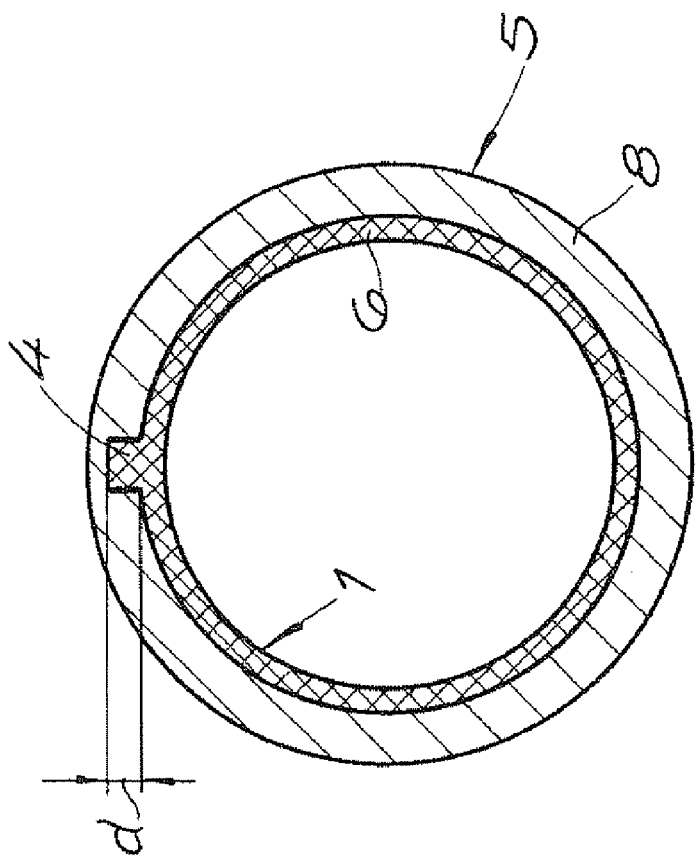
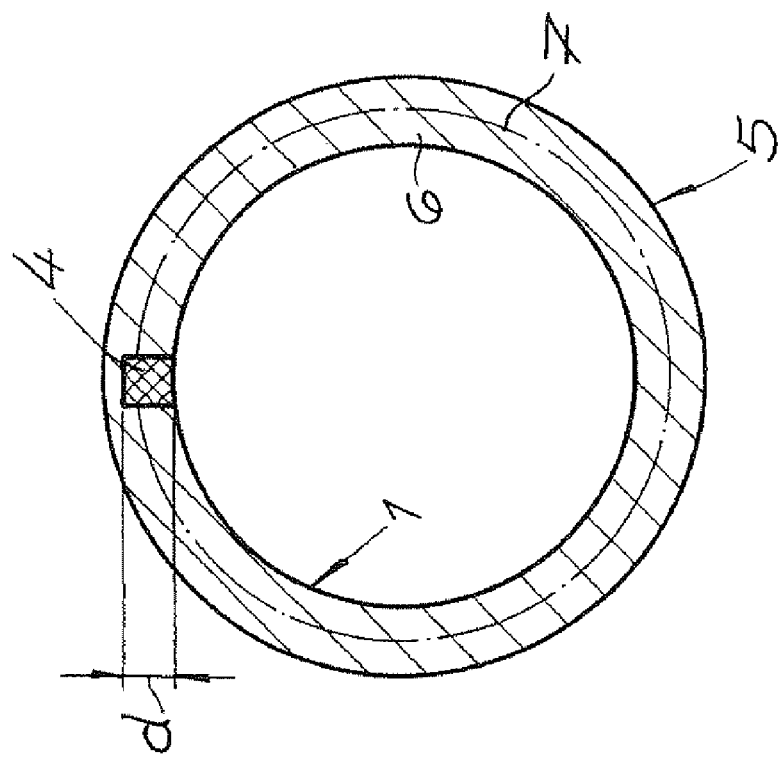

MOTOR VEHICLE HOSE

CROSS-REFERENCE TO RELATED APPLICATIONS

This patent application claims priority pursuant to Title 35 U.S.C. §119 to European Patent Application No. 06005281.8, filed on Mar. 15, 2006.

BRIEF SUMMARY OF THE INVENTION

The invention concerns a motor vehicle hose consisting of plastic material, where the interior surface of the hose consists at least in segments of an electrically conducting plastic material. Electrically conducting plastic material refers specifically to a plastic matrix that contains electrically conducting particles, such as carbon black particles or carbon fibers.

Motor vehicle hoses with electrically conducting interior layers are known in many different embodiments. The electrically conducting plastic material is a relatively expensive raw material, compared to non-conducting plastic material. Moreover, the electrically conducting plastic material modifies the mechanical properties of the hose in a negative direction. In particular, large amounts of electrically conducting plastic material or thicker layers of electrically conducting plastic material reduce the impact strength at low temperatures.

Motor vehicle hoses of the type described above are often constructed with flanges. A flange is an enlargement of the hose extending beyond the circumference of the hose for a specific limited length, such that the exterior diameter and the interior diameter of the hose are increased for the length of the flange. Such flanges are used, for example, to axially fix or position the hose in a clip attached to the vehicle body. A flange is normally produced in the hose by cold or hot molding after extrusion. The molding of such a flange stretches the material on the interior surface of the hose. This stretching process increases the distances between the electrically conducting particles located there and thus reduces the conductivity of the plastic material in the stretched segments or even interrupts it totally. This is an undesirable detrimental effect associated with the production of flanges in motor vehicle hoses.

The motor vehicle hoses of the type described above are also connected often by rotation welding or vibration welding with other hose components, such as with a suitable end fitting. The interior surface of the hose is often impacted by the welding process, and due to the abrasion on the contact areas associated with welding, it is possible that the electrical conductivity will be impacted negatively in an undesirable manner, particularly if the conducting inner layer is thin.

In contrast, the invention addresses the technical problem of providing for a hose of the type specified above that avoids the disadvantages listed above and where a sufficient electrical conductivity is assured over the long term, particularly in critical regions (flanges, welding joints).

In order to solve this technical problem, the invention provides for a motor vehicle hose, where the interior surface of the hose consists at least in segments of an electrically conducting plastic material, where at least one section that extends over merely a portion of the circumference of the hose is designed to be constructed of electrically conducting plastic material and that is connected to the electrically conducting interior surface of the hose, where the section extends in a radial direction in part into a layer of non-conducting plastic material, and where the section extends at least in some segments in the longitudinal direction of the hose.

Motor vehicle hose refers specifically to a hose for the movement of fuels. The interior surface of the hose, as referenced in this invention, refers to the interior surface of the hose, which is in contact with the flowing fluid medium, specifically the fuel. Electrically conducting plastic material, as referenced in this invention, refers specifically to a plastic material matrix that contains electrically conducting particles, such as carbon black particles or carbon fibers.

That the electrically conducting section is connected to the electrically conducting interior surface of the hose implies also that the electrically conducting section itself may form an electrically conducting segment on the interior surface of the hose. That the electrically conducting segment extends in part in a radial direction into a layer of non-conducting plastic material implies that the section extends merely over a portion of the thickness or layer thickness of the layer of non-conducting plastic material. In other words, the electrically conducting section of this layer does not extend through the layer of non-conducting plastic and that, in a radial direction, there is always yet a partial layer of non-conducting plastic material above the electrically conducting segment. The invention includes an electrically conducting segment that extends over at least 40%, preferred over at least 45%, and particularly preferred over at least 50% of the thickness of the non-conducting plastic layer. It is most useful that the electrically conducting segment extends over no more than 85%, preferably over no more than 80%, preferred over no more than 75%, very much preferred over no more than 70% and particularly preferred over no more than 65% of the thickness of the electrically non-conducting plastic layer. The invention includes an electrically conducting section that extends to the center, expressed in wall thickness, of the non-conducting plastic layer. In a preferred embodiment of the invention, the electrically conducting section extends at least to the vicinity, preferably to the region of the "neutral fiber" of the hose wall. This region of the "neutral fiber" refers to the center, expressed in wall thickness, of the non-conducting plastic layer, which is least affected by compression and stretching in a bend of the hose or during the molding of a flange of the hose. If the hose has a single layer, the neutral fiber will be in the center of this layer, expressed in wall thickness. In a preferred embodiment of the invention, the radial distance between the electrically conducting segment and the neutral fiber is 0 to 0.35 mm, preferably 0 to 0.3 mm, preferred 0 to 0.25 mm, and very much preferred 0 to 0.2 mm.

In the invention, the electrically conducting section extends merely over a segment of the circumference or the interior circumference of the hose. The invention includes an electrically conducting section that extends over no more than 30%, preferably over no more than 20%, preferred over no more than 15%, very much preferred over no more than 10% and particularly preferred over no more than 5% of the circumference or the interior circumference of the hose.—It is most useful that the electrically conducting section has a rectangular, trapezoidal, round, or half-round cross section.

The invention also includes that the motor vehicle hose of the invention is a multi-layer hose. In other words, additional layers or plastic layers may connect to the layer of non-conducting plastic.

In a particularly preferred embodiment of the invention, at least one electrically conducting section forms the electrically conducting segment of the interior of the hose and the remainder of the interior of the hose consists of electrically non-conducting plastic material. Thus, this embodiment of the motor vehicle hose of the invention has an interior layer of non-conducting plastic, which forms the bulk of the interior surface of the hose. At least one electrically conducting section extends only over a partial segment of the circumference of the hose and extends into the non-conducting interior layer. It is fundamentally possible to design several electrically conducting sections that extend into the interior layer and that extend along the longitudinal direction of the hose. However, the particularly preferred embodiment of the invention is designed with just a single electrically conducting segment, which only partially extends into the non-conducting plastic layer. The electrically non-conducting plastic layer consists preferably of a fluorocarbon polymer or a polyamide. Suitable fluorocarbon polymers for the electrically non-conducting plastic layer are in particular ETFE and PVdF. It is most useful if the electrically conducting section is a plastic matrix consisting of fluorocarbon polymer or polyamide. Suitable fluorocarbon polymers for the electrically conducting section are ETFE and PVdF.

In another particularly preferred embodiment of the invention, the interior layer of the hose consists of conducting plastic material, and a layer of non-conducting plastic material connects to the outside of this conducting interior layer. The section of conducting plastic is connected to the conducting interior layer in this embodiment and partially extends into the non-conducting plastic layer. The invention includes a conducting interior layer that covers the entire circumference or the entire interior circumference of the motor vehicle hose. The invention also includes that the section of conducting plastic material is a single piece connected to the electrically conducting interior layer and partially extends into the non-conducting plastic layer. It is most useful here that the electrically conducting section consists of the same material as the electrically conducting interior layer. Preferably, the radial thickness d of the electrically conducting section is more than half, preferred more than two-thirds and very much preferred more than three quarters of the radial thickness of the electrically conducting interior layer. In one embodiment, the radial thickness d of the electrically conducting segments is larger than the radial thickness of the electrically conducting interior layer.

The electrically non-conducting plastic layer may be connected in a radial direction to the outside to additional layers or plastic layers. It is most useful that the plastic matrix of the electrically conducting interior layer and/or the electrically conducting section consists of a fluorocarbon polymer or polyamide. The fluorocarbon polymer is specifically ETFE or PVdF. Conducting additives, specifically carbon black particles, are imbedded in the plastic matrix of the electrically conducting interior layer and the plastic matrix of the electrically conducting section.

The invention includes that the electrically conducting section has a radial thickness d of at least 0.2 mm, preferably at least 0.25 mm, preferred of at least 0.3 mm and very much preferred of at least 0.35 mm.—In one embodiment variation, the radial thickness d of the electrically conducting segment is at least 20%, preferably at least 25%, preferred at least 30% and very much preferred at least 35% of the entire wall thickness of the motor vehicle hose.

In a particularly preferred embodiment of the invention, the electrically conducting section extends past a flange of the hose in the longitudinal direction of the hose. Flange refers in this invention to a local enlargement of the wall of the motor vehicle hose that extends specifically over the entire circumference of the hose. As has been explained above, the production of such a flange stretches the inside of the hose wall, thus generating additional space between the electrically conducting particles, such that the hoses known from the state of the arts often can no longer assure electrical conductivity.

The invention is based on the insight that the electrically conducting section described in the invention will assure that electrically conducting material is available also in segments of the hose wall that are not stretched, specifically in the area of the center of the wall of the hose, such that an optimal conductivity of the hose is assured.

In an additional particularly preferred embodiment of the invention, the electrically conducting section extends in a friction welding area of the hose in the longitudinal direction of the hose. The friction welding area refers specifically to an end of the hose that is to be connected to another hose element, specifically a fitting, by rotation welding or vibration welding. The invention is based here on the insight that, given the electrically conducting section in accordance with the invention, there will still be sufficient electrically conducting material even after the welding and the associated abrasion of the plastic surfaces to assure an optimal electrical conductivity of the hose. The invention includes that the electrically conducting section consists exclusively of a single material or essentially consists of a material that can withstand a friction welding connection. It is most useful that this involves an appropriate plastic matrix in which conducting particles, specifically carbon particles or carbon fibers, are distributed. As described above, the plastic matrix of the electrically conducting section consists preferably of a fluorocarbon polymer or a polyamide. ETFE and PVdF are particularly well suitable fluorocarbon polymers. It is most useful in the embodiment in which the electrically conducting section forms an electrically conducting segment of the interior of the hose that the radial thickness d of the electrically conducting section is larger than the radial thickness of the inner layer of the hose, which is removed by abrasion in an abrasion welding process. For the embodiment with the electrically conducting interior layer, it is preferable that the sum of the radial thickness of the electrically conducting interior layer and the radial thickness d of the electrically conducting section is larger than the radial thickness of the inner layer of the hose that is removed by abrasion during the abrasion welding process.

The invention is based on the insight that the motor vehicle hose of the invention will always assure that the hose has a sufficient conductivity. This also applies to areas where a flange is incorporated into the motor vehicle hose or for segments of the motor vehicle hose subject to rotation welding or vibration welding. Nonetheless, the motor vehicle hose of the invention can be produced by simple and low-cost means. To that extent, the invention is based on the insight that the embodiment of the motor vehicle hose of the invention requires merely a relatively small amount of electrically conducting plastic material and that nonetheless the electrical conductivity is also assured over the long term even in critical segments. This permits savings of expensive raw material in an advantageous manner. Furthermore, the motor vehicle hose of the invention is distinguished from the electrically conducting hoses known from the state of the arts by outstanding mechanical properties. Thus, the hose of the invention has a much better impact strength at low temperatures than many other known hoses.

BRIEF DESCRIPTION OF THE DRAWINGS

FIG. 1 is a longitudinal cross sectional view of a motor vehicle hose with a flange;

FIG. 2*a* is an enlarged section of the wall of the motor vehicle hose prior to the production of the flange FIG. 2*b* is an enlarged section of the wall of the motor vehicle hose after the production of the flange;

FIG. 3 is a cross section through a motor vehicle hose of the invention in a first embodiment; and FIG. 4 is the object of FIG. 3 in a second embodiment.

DETAILED DESCRIPTION OF THE INVENTION

FIG. 1 depicts a longitudinal section of a motor vehicle hose of plastic material with an interior surface 1 consisting of electrically conducting plastic material. Flange 2 was produced in this motor vehicle hose by extending the walls of the motor vehicle hose towards the outside. FIGS. 2a and 2b show enlarged sections of interior surface 1 or the interior wall of the motor vehicle hose. Electrically conducting particles 3 are imbedded in the plastic material of the interior wall. The enlarged section in FIG. 2a shows the condition of the interior wall prior to the production of flange 2. The electrically conducting particles 3 have here merely a short separation from each other, such that the electrical conductivity is assured. FIG. 2b shows the condition corresponding to FIG. 1 after the production of flange 2. The segment of the interior wall shown in FIG. 2b corresponds to the segments of the interior wall shown in hatched lines in FIG. 1. The production of flange 2 caused the plastic segments of the interior wall to stretch, such that the electrically conducting particles have a relatively large separation from each other, which does not assure sufficient electrical conductivity at all times. The neutral fiber 7 in the vicinity of the center of the wall of the hose is also shown in dashed lines in FIG. 1. This refers to the area of the wall in its very center, which is not stretched or compressed during the production of flange 2.

FIGS. 3 and 4 show two embodiments of the motor vehicle hose of the invention in a cross section. The embodiment depicted in FIG. 3 is designed with an electrically conducting section 4 that forms the electrically conducting segment of interior surface 1 of the hose. The electrically conducting section 4 consists of a plastic matrix with embedded electrically conducting particles 3. The other segments of interior surface 1 of the hose consist of plastic material 5 that does not conduct electricity. Thus, this embodiment includes an interior layer 6 of non-conducting plastic 5 that constitutes the bulk of interior surface 1 of the hose. The electrically conducting section 4 extends into this interior layer 6, where electrically conducting section 4 extends in the invention merely over a part of the thickness of interior layer 6. The invention includes that electrically conducting segment 4 extends at least into the vicinity of neutral fiber 7. As pointed out above, neutral fiber 7 is located in the vicinity of the wall center of interior layer 6, if the hose has this interior layer 6 as the only layer. If the hose has several sheet layers, neutral fiber 7 is located in the middle segment of the hose wall, expressed in terms of thickness. In an embodiment with the appropriate type of layer thicknesses, neutral fiber 7 is then likewise in the non-conducting interior layer 6.

The embodiment depicted in FIG. 4 includes the hose's interior layer 6 consisting of electrically conducting plastic material. This conducting interior layer 6 is in contact with a further layer 8 consisting of non-conducting plastic material 5. Electrically conducting section 4 is linked here solidly with conducting interior layer 6 and extends into the electrically non-conducting layer 8. It is most useful that electrically conducting section 4 extends at least into the center of layer 8, expressed in terms of thickness.

The electrically conducting section 4 extends preferably over at least 40%, preferred over at least 45% and very much preferred over at least 50% of the layer thickness of layer 8.—The invention includes that electrically conducting section 4 extends into the vicinity, preferred to the segment of neutral fiber 7 of the hose wall. If the hose wall is merely a layered combination of electrically conducting interior layer 6 and the additional layer 8 of electrically non-conducting plastic material, the neutral fiber is in the center of this combination of layers, expressed in terms of thickness. If there are additional layers beyond layer 8, the neutral fiber 7 will be in the center of this layer aggregate, expressed in terms of thickness. In an embodiment with an appropriate design of the layer thicknesses, neutral fiber 7 for the previously listed cases is in layer 8 of electrically non-conducting plastic material 5.

If the motor vehicle hose in the vicinity of flange 2 has the design depicted in FIG. 3 or 4, the disadvantages associated with the known motor vehicle hoses will not obtain. Rather, the electrical conductivity of the motor vehicle hose with the characteristics of the invention will be sufficiently assured, despite the production of flange 2. Moreover, a motor vehicle hose with the characteristics of the invention will be used, particularly also in a friction welding segment as described in the embodiments of FIGS. 3 and 4. A motor vehicle hose with the characteristics of the invention will maintain a sufficient conductivity of the hose even despite the friction welding and the associated surface abrasion.

Various features of the present invention have been explained with reference to the embodiments shown and described. It must be understood that numerous modifications may be made without departing from the spirit and scope of the invention as defined by the appended claims.

We claim:

1. A hose made of polymeric material having a wall with an interior surface defining a flow passage, said wall of said hose comprising:
    an interior layer of conductive polymeric material covering the entire interior circumference of said hose to contact flowing fluid medium,
    at least one layer of non-conductive polymeric material connected to the outside of said interior layer;
    at least one section of conductive polymeric material connected to said interior layer of conductive polymeric material and extending radially partially into said layer of non-conductive polymeric material;
    said section of conductive polymeric material extending circumferentially only a portion of the circumference of said hose.

2. A hose as claimed in claim 1 wherein said section of conductive polymeric material extends at least to the neutral fiber of said hose.

3. A hose as claimed in claim 1 wherein said section of conductive polymeric material extends at least to the radial center of said wall of said hose.

4. A hose as claimed in claim 1 wherein said section of conductive polymeric material extends longitudinally of said hose.

5. A hose as claimed in claim 1 wherein said hose includes a flange formed therein and said section of conductive polymeric material extends past said flange.

6. A hose as claimed in claim 1 wherein said hose includes a friction weld area from which a portion of the radial thickness of the hose is removed and said section of conductive polymeric material extends into said friction weld area and has a radial thickness that exceeds the radial thickness of said removed portion.

7. A hose as claimed in claim 1 wherein said at least one section of conductive polymeric material extends from at least 40% to no more than 85% of the radial thickness of said at least one layer of non-conductive material.

8. A hose as claimed in claim 1 wherein said at least one section of conductive polymeric material extends from between 5% to 30% of the circumference of said hose.

9. A hose as claimed in claim 1 wherein the radial thickness of said at least one section of conductive polymeric material extending radially partially into said layer of non-conductive polymeric material is at least more than half the radial thickness of said interior layer of electrically conductive polymeric material and less than the radial thickness of said interior layer of electrically conductive polymeric material.

* * * * *